United States Patent [19]

Ogden

[11] 3,727,764
[45] Apr. 17, 1973

[54] FILTERING APPARATUS HAVING AN INTEGRALLY REMOVABLE FILTER CARTRIDGE

[76] Inventor: Hubert S. Ogden, 1850 N. Whitley, Hollywood, Calif. 90280

[22] Filed: Nov. 22, 1971

[21] Appl. No.: 200,850

[52] U.S. Cl. ................................. 210/232, 210/444
[51] Int. Cl. ............................................. B01d 27/08
[58] Field of Search ...................... 210/232, 437, 440, 210/441, 442, 447, DIG. 17, 443, 444

[56] References Cited

UNITED STATES PATENTS

| | | | |
|---|---|---|---|
| 3,344,925 | 10/1967 | Graham | 210/437 X |
| 3,405,805 | 10/1968 | Hatter | 210/440 X |
| 3,087,849 | 4/1963 | Smith | 210/232 X |
| 3,675,776 | 7/1972 | Campo | 210/232 |
| 2,197,471 | 4/1940 | Hooper | 210/437 |
| 3,615,257 | 10/1971 | Frost et al. | 210/447 |

FOREIGN PATENTS OR APPLICATIONS

| | | | |
|---|---|---|---|
| 514,963 | 2/1955 | Italy | 210/DIG. 17 |

*Primary Examiner*—Samih N. Zaharna
*Assistant Examiner*—T. A. Granger
*Attorney*—Harold L. Jackson et al.

[57] ABSTRACT

A filtering apparatus is described in which a filter assembly is encapsulated in a flexible, pliable, light weight shell and is removable as a unit from the filter housing without manually contacting filter media and/or liquid. The filter housing comprises a manifold and a cylindrical casing joined together to form a cavity for receiving the cartridge. The manifold further includes inlet and outlet conduits extending therethrough. The filter cartridge comprises a pair of cylindrical shells interconnected at their open ends, with the interior of the shells forming a cavity for receiving a filter assembly. The end plane of one of the cylindrical shells includes a pair of tubular extensions extending into the inlet and outlet conduits of the manifold. The two cartridge shells are made of plastic or other suitable material and are sufficiently flexible to bear against the side walls of the housing cavity during operation. In one embodiment, the mating ends of the cartridge shells are coupled by a telescoping connection and bonded. In another embodiment, the ends of the cartridge shells form mating annular flanges which are bonded together and further secured between two shoulders formed by the interconnecting housing members. The filter assembly preferably comprises a plurality of annular filter pads surrounding a perforated open ended sleeve and stacked between a pair of annular compression plates. To replace the encapsulated filter cartridge, the manifold and casing are separated and the used filter cartridge is removed as a unit. A new cartridge can be installed within the housing in a similar manner.

13 Claims, 3 Drawing Figures

3,727,764

FILTERING APPARATUS HAVING AN INTEGRALLY REMOVABLE FILTER CARTRIDGE

BACKGROUND OF THE INVENTION

1. Field of the Invention

The present invention relates to fluid filtering devices and more particularly to containers for holding replaceable filter cartridges.

2. Description of the Prior Art

Replaceable filter cartridges are used in a wide variety of applications to filter foreign matter and other contamination from liquids or gases. The present invention is particularly adapted for housing a filter cartridge which is used to purify drinking water. One such cartridge is distributed by the Ogden Filter Co., Inc. and is described in U. S. Pat. No. 3,528,554, issued Sept. 15, 1970. The cartridge comprises a plurality of annular filter pads surrounding a perforated open ended sleeve and stacked between a pair of annular compression plates. The filter media may be of conventional fibrous filter materials which may compress on contact with liquid under pressure. Untreated water passes through the exterior surface of the filter pads, through a centrally disposed screen and then into the open ended sleeve where the filtered liquid is drained. The container is formed by a top cover plate which includes an annular surface for engaging the top cartridge compression plate. A closure plate is fastened by means of a spring to force the closure plate against the bottom compression plate of the cartridge to compress the filter pads and prevent the leakage of unfiltered liquid into the cartridge sleeve.

Although prior filter assemblies, and especially the assembly described in the above-mentioned patent, have performed well, they all suffer with a common shortcoming.

The problem encountered with the prior filter assemblies is the necessity of periodically replacing the cartridge which is saturated with liquid, dirt and contaminants and manually contacting these pads is unpleasant and undesirable. The present invention overcomes these objections since all the liquid, dirt and contaminants are held in the encapsulated cartridge.

SUMMARY OF THE INVENTION

The present invention obviates the above-mentioned shortcoming by completely eliminating the need for handling and contacting the filter media when replacing the cartridge.

The filter apparatus comprises a pair of external housing members interconnected to form a cavity for receiving a filter cartridge. The filter cartridge comprises a unitary housing having a plurality of filter pads located therein. In replacing the used filters, the filter cartridge is removed as a unit with the filter pads remaining untouched within the cartridge. The entire cartridge is then discarded and a new one is placed within the housing cavity.

The primary advantage of the present invention is that the filter cartridges can be easily removed as a unitary structure and replaced with new cartridges in a similar manner.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENTS

Figure 1:
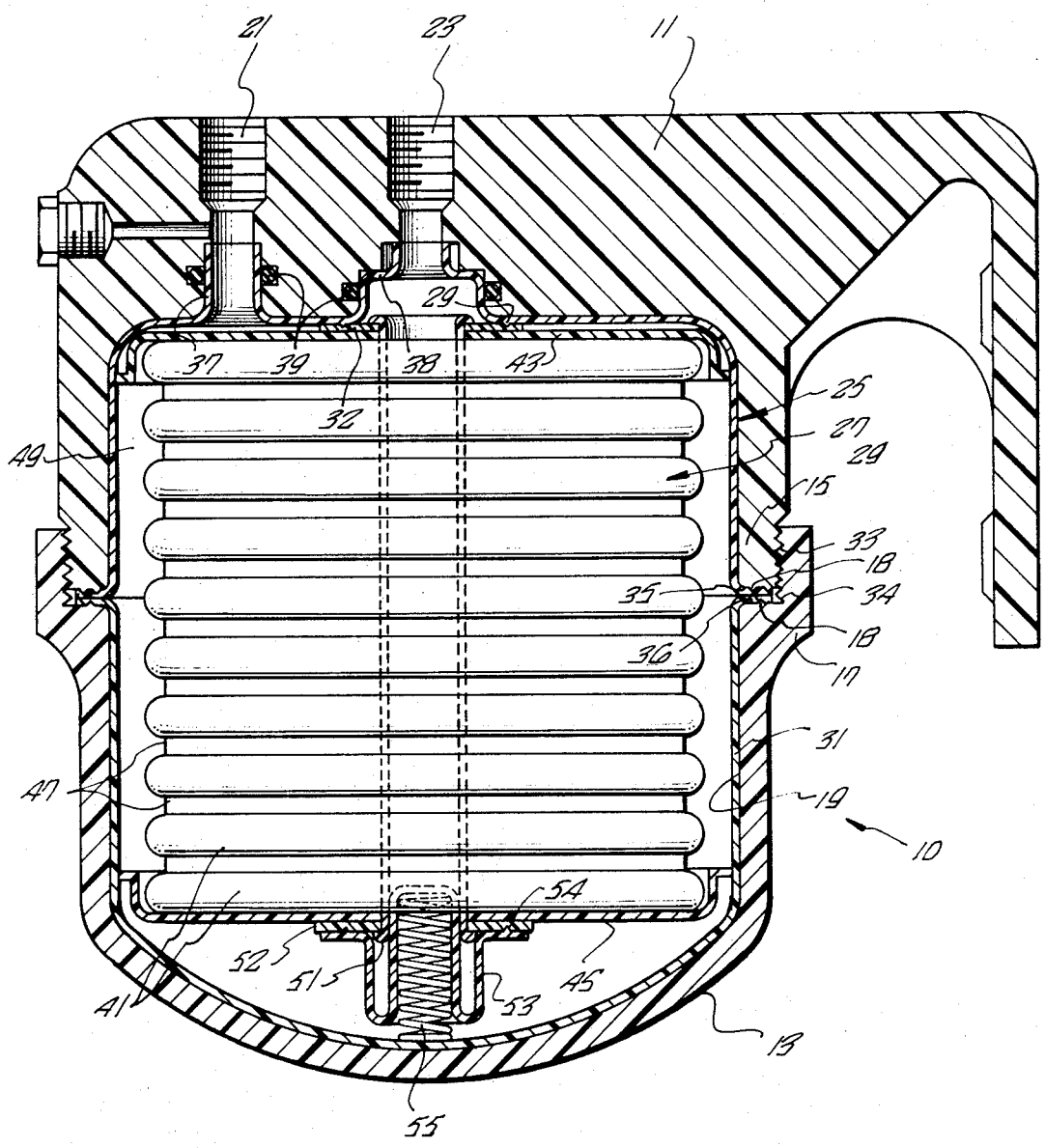
FIG. 1 is a sectional view of the filtering apparatus of the present invention.

Referring now to the drawings, FIG. 1 illustrates a filtering apparatus, generally indicated by arrow 10, having an outer casing comprising a manifold 11 and a bottom cylindrical housing member or bowl 13. Each of the housing elements 11 and 13 includes an open end 15 and 17, respectively, which is threadedly secured to the other to form a unitary housing having a cavity 19 formed therein.

The manifold 11 further includes a threaded inlet conduit 21 and a threaded outlet conduit 23 extending through the upper wall thereof.

The housing cavity 19 is adapted to receive a filter cartridge 25 for housing a filter assembly 27. The filter cartridge 25 comprises a pair of cylindrical open ended shells 29 and 31 in which the open ends form a pair of mating annular flanges 33 and 34. These flanges 33 and 34 are bonded together by conventional means and are positioned between a pair of shoulders 35 and 36 formed on the housing elements 11 and 13. Each of the shoulders 35 and 36 includes at least one annular ridge 18 formed thereon for compressing and gripping the surfaces of the flanges 33 and 34. The filter cartridge 25 is preferably made of polypropylene or polyethylene or the like. The top cylindrical shell 29 further includes a pair of extensions 37 and 38 extending into the inlet and outlet conduits 21 and 23 respectively. A pair of o-ring seals 39 are positioned on the exteriors of the extensions 37 and 38 to prevent water from leaking into the cavity 19. An annular ridge 28 is formed on the surface of the shell 29 adjacent the inlet and outlet conduits 21 and 23 for engaging a washer 32.

In the preferred embodiment, the filter assembly comprises a plurality of filter pads 41 stacked between a pair of annular compression plates 43 and 45. Between each of the filter pads 41 there is placed a spacer 47 which exposes a very substantial portion of the exterior surface of each adjoining filter pad 41 to the liquid within the chamber 49 formed within the cartridge 25. Each of the filter pads 41 includes a screen (not shown) disposed in the interior thereof for draining purified water that has passed through the pads into a centrally disposed perforated sleeve 51. An upwardly extending cylindrical plug 53 is slidably received in the perforated sleeve 51, and a helical spring 55 is biased against the bottom of the cartridge shell and extends into the plug 53 to urge it upwardly. A washer 52 is mounted between the plug 53 and the compression plate 45 with the plug 53 having an annular ridge 54 for engaging the washer 52.

In installing the filter cartridge 25 within the cavity 19, the bottom housing member 13 is unscrewed from the manifold 11 and separated therefrom. The filter cartridge 25 is then inserted within the upper portion of the cavity formed by the manifold 11 and aligned to position the extensions 37 and 38 into the inlet and outlet conduits 21 and 23 respectively. The bottom housing member 13 is then screwed onto the manifold 11 to completely enclose the filter cartridge 25. As the two housing members 11 and 13 are being secured together, the annular shoulders 35 and 36 are drawn together over the annular flanges 33 and 34 to apply a securing force thereto.

After the housing members 11 and 13 are secured, the apparatus is in its operable position. In this position, liquid under pressure is admitted through the inlet conduit 21, into the chamber 49. In this chamber 49, the water under pressure causes the filter pads 41 to contract. The water under pressure also forces the compression plates 43 and 45 upwardly along with the plug 53 to prevent any water from entering the outlet conduit 23 except through the filter pads 41. As stated previously, the water passes through the filter pads with the contaminants entrapped within the filter media. Thus, the water passing through the perforated sleeve 51 and out of the outlet conduit 23 is free from any dirt or contaminants.

It should be noted that the cartridge housing 25 is sufficiently flexible to expand against the walls of the cavity 19 when under pressure. This enables the cartridge housing to be made more economically.

After the filter pads 41 have been filled to capacity with contaminants, the bottom housing 13 is again unscrewed from the manifold 11 and the filter cartridge 25 is removed as a unit with the filter assembly remaining intact within the cartridge. The new cartridge is then installed in the manner described above.

Figure 2:
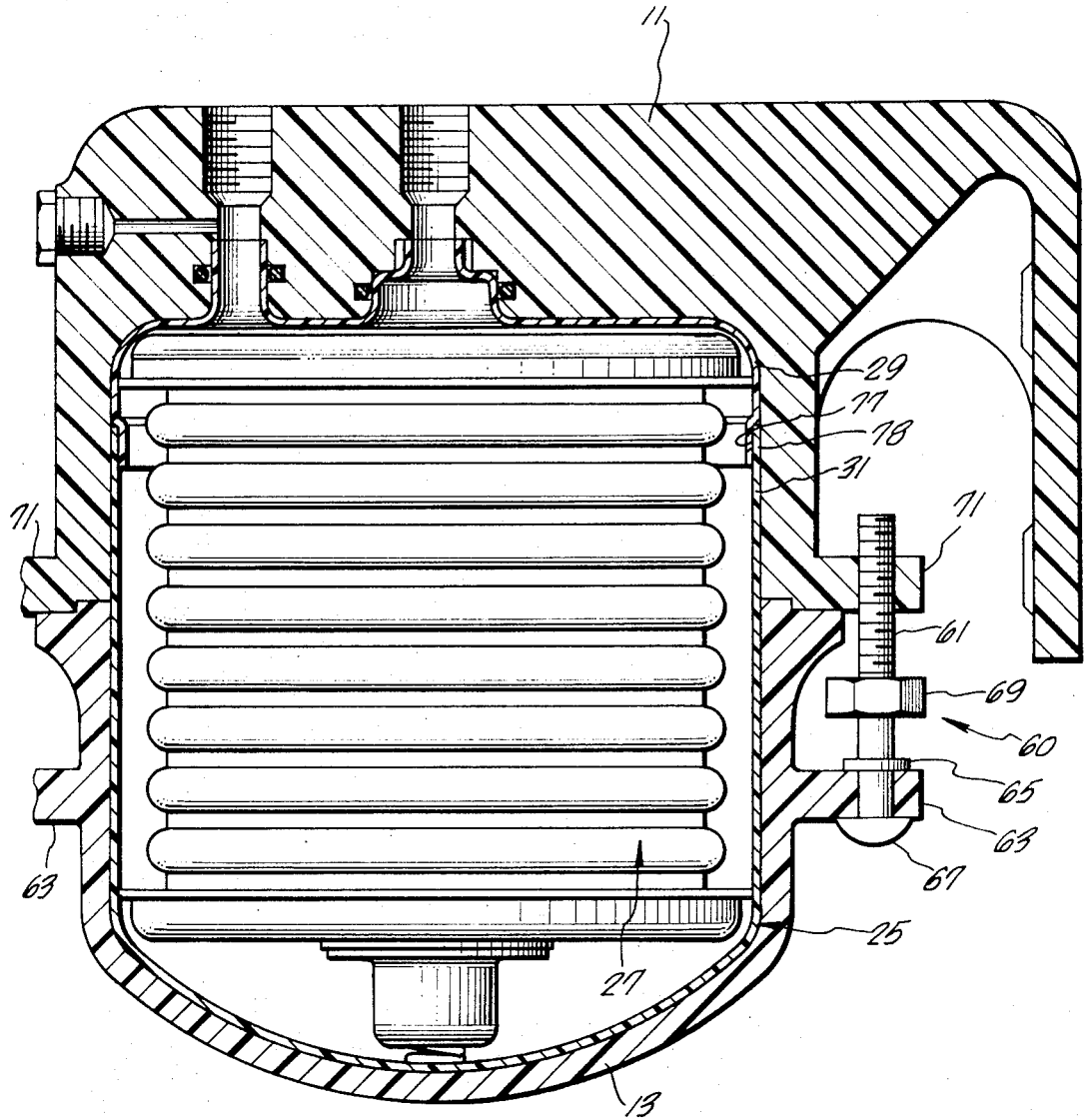
FIG. 2 is a sectional view of a second embodiment of the present invention.

FIG. 2 illustrates a second embodiment of the filtering apparatus. In this embodiment, the manifold 11 and bottom housing 13 are interconnected by means of a plurality bolt fastening means, generally indicated by arrow 60. The fastening means 60 comprises a plurality of bolts 61 journaled with a plurality of bored flanges 63 formed on the exterior of the bottom housing 13. A snap-ring 65 is mounted within a groove (not shown) formed just above the head 67 of each bolt 61 to lock the bolt 61 against axial movement.

A thimble 69 is splined to each bolt 61 to provide a convenient rotary driving mechanism for the bolt 61 without requiring the use of any tools.

The other ends of the bolts 61 are adapted to be threadedly connected to a plurality of bored flanges 71 formed on the exterior of the manifold 11. Upon screwing the bolts 61 through the bored flanges 71 the housing elements 11 and 13 are pulled together at their open ends 73 and 75. The main advantage of the fastening means 60 is that the bolts 61 can be individually manipulated to correct for any misalignment in the housing or cartridge structure.

The filter cartridge 25 is similar to the cartridge shown in the first embodiment with the exception that the mating ends 77 and 78 of the shells 29 and 31 are telescoped together and bonded.

The filter assembly located within the cartridge is identical to the assembly shown in FIG. 1.

Figure 3:
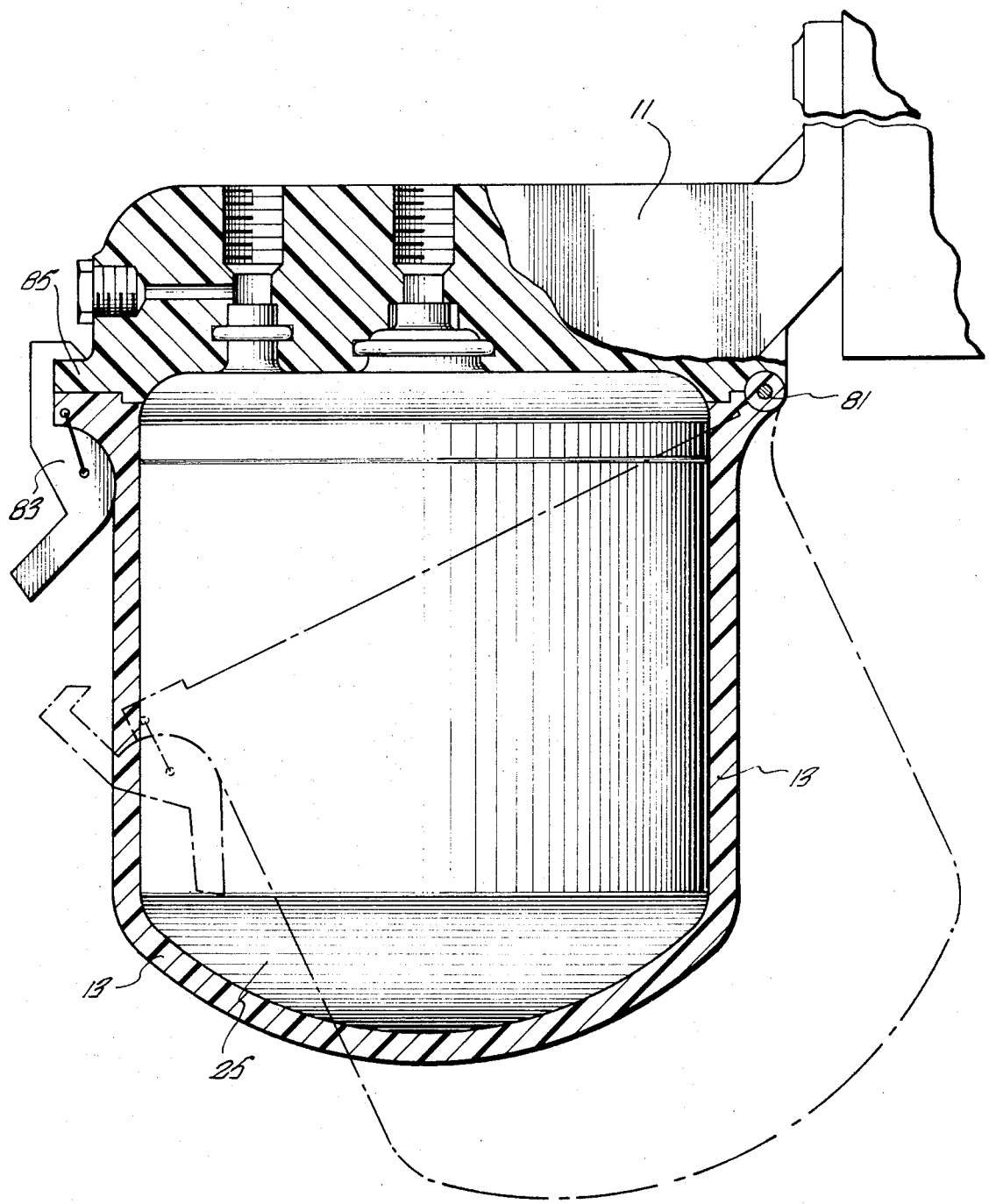
FIG. 3 is a sectional view of a third embodiment of the present invention.

FIG. 3 shows a third embodiment of the housing structure. In this embodiment, the bottom housing member 13 is pivotally connected on one side thereof to the manifold 11 by a hinge connection 81. The other side of the housing element 13 is connected to the manifold by a latch 83 extending over a flange 85 formed on the manifold. The cartridge housing and filter assembly are identical to that shown in FIG. 2.

The operation of the second and third embodiments operate in substantially the same manner as the first. That is, the two housing elements 11 and 13 are separated and the filter cartridge is removed as a unit without having to disassemble the filter assembly.

It should be noted that various modifications can be made to the apparatus while still remaining within the purview of the following claims.

What is claimed is:

1. An apparatus for filtering foreign matter and other contaminants from liquids or gases comprising:
   a pair of external housing members including a first member having inlet and outlet conduits extending through the first member and a second member connected to said first member to form a first cavity communicating with the inlet and outlet conduits; and
   a filter cartridge having a unitary housing positioned within said first cavity, said cartridge housing forming a second cavity for receiving a filter assembly comprising a filter media through which the liquid or gases are adapted to pass, said cartridge housing including two connected cartridge shells which form the second cavity, one of said cartridge shells having a pair of open ended conduit extensions extending through the body of the shell, said conduit extensions positioned to be respectively in fluid communication with the inlet and outlet conduits of said first member whereby said cartridge housing is removable as a unit from said first cavity after said external housing members have been separated.

2. An apparatus for filtering foreign matter and other contaminants from fluid comprising:
   a pair of external housing members including a first member having inlet and outlet conduits extending through the first member and a second member connected to said first member to form a cavity communicating with the inlet and outlet conduits;
   means for filtering the fluid including a filter media through which the fluid is adapted to pass;
   a fluid tight unitary cartridge housing member entirely sealing the means for filtering the fluid within the housing member and preventing fluid contact with the cavity, the housing member adapted to be positioned within the cavity;
   a pair of conduit members on the unitary housing member adapted to respectively communicate with the inlet and outlet conduits and providing the only ingress and egress paths for fluid to the filter media; and
   means for sealing the first member conduits and the unitary housing conduits to prevent fluid contact with the cavity.

3. The invention of claim 2 wherein the conduit members on the unitary cartridge housing comprise a pair of extension members having open ends adapted to provide fluid communication with the inlet and outlet conduits on the first member.

4. The invention of claim 2 wherein said cartridge housing comprises a pair of cylindrical shells with interconnected ends.

5. The invention of claim 4 wherein the ends of said cartridge shells form a pair of mating annular flanges bonded together and positioned between a pair of shoulders formed by said housing members when said housing members are interconnected.

6. The invention of claim 4 wherein the end of one of said cartridge shells telescopes into the end of the other cartridge shell with the interengaging surfaces being bonded together.

7. The invention of claim 4 wherein said cartridge shells are made of a plastic material.

8. The invention of claim 7 wherein said plastic material is polypropylene.

9. The invention of claim 7 wherein said plastic material is polyethylene.

10. The invention of claim 4 wherein the first member and the second member are interconnected by interengaging thread means located on the open ends of each member.

11. The invention of claim 4 wherein the first member and the second member are connected by means of a plurality of threaded bolts.

12. The invention of claim 11 wherein each threaded bolt is rotatably mounted on a first flange formed on the second member with the threaded end of the bolt adapted to engage a threaded bore formed in a second flange formed on the first member.

13. The invention of claim 4 wherein the first member and the second member are hingeably connected on one side thereof and secured on the other side by means of a latch mechanism.

* * * * *